United States Patent [19]
Williams et al.

[11] Patent Number: 5,260,645
[45] Date of Patent: Nov. 9, 1993

[54] POWER SUPPLIES

[75] Inventors: Brian Williams; David M. Addison, both of Gloucestershire, England

[73] Assignee: Smiths Industries Public Limited Company, London, England

[21] Appl. No.: 856,590

[22] Filed: Mar. 20, 1992

[30] Foreign Application Priority Data

Apr. 17, 1991 [GB] United Kingdom ............... 9108255

[51] Int. Cl.[5] .............................................. G05F 5/00
[52] U.S. Cl. ..................................... 323/299; 318/254
[58] Field of Search ............... 318/138, 254, 439, 599; 323/299, 300, 301, 302, 303, 304; 307/57, 58

[56] References Cited

U.S. PATENT DOCUMENTS

| | | | |
|---|---|---|---|
| 3,946,302 | 3/1976 | Kovalick et al. | 323/19 |
| 4,168,476 | 9/1979 | Petrizio | 323/19 |
| 4,230,970 | 10/1980 | Potter et al. | 323/17 X |
| 4,241,278 | 12/1980 | Walther | 315/106 |
| 4,510,422 | 4/1985 | Ogura | 318/254 |
| 4,580,090 | 4/1986 | Bailey et al. | 323/303 |
| 4,634,892 | 1/1987 | Isbell et al. | 307/265 |
| 4,658,204 | 4/1987 | Goodwin | 323/258 |
| 4,763,347 | 8/1988 | Erdman | 318/254 |
| 4,845,605 | 7/1989 | Steigerwald | 363/21 |
| 4,973,876 | 11/1990 | Roberts | 310/316 |

FOREIGN PATENT DOCUMENTS

| | | |
|---|---|---|
| 2225879 | 11/1974 | France . |
| 2416515 | 8/1979 | France . |
| 1470799 | 4/1977 | United Kingdom . |
| 1505829 | 3/1978 | United Kingdom . |

*Primary Examiner*—Bentsu Ro
*Attorney, Agent, or Firm*—Pollock, VandeSande and Priddy

[57] ABSTRACT

The power supply of a brushless d.c. motor has a trigger circuit that controls the frequency of a ramp generator which receives an output Vs from an unregulated voltage supply. The amplitude of the output $V_R$ of the ramp generator is dependent on the amplitude of its input. A comparator receives the ramp output $V_R$ at one input and a steady voltage $V_D$ at the other input. The comparator produces a pulse output Vc, with each pulse being initiated and terminated at transitions of the ramp signal and the steady signal so that the width of each pulse increases when the unregulated voltage source decreases. The pulse output Vc is supplied to the control input of the motor's commutation circuit. The commutation circuit switches the supply voltage Vs to the coils of the motor under control of the input Vc so that its mean d.c. output is independent of variation in the supply voltage.

2 Claims, 2 Drawing Sheets

POWER SUPPLIES

BACKGROUND OF THE INVENTION

This invention relates to power supplies.

The invention is more particularly concerned with power supplies for electric motors.

Brushless dc motors are driven by a commutation circuit which applies a drive voltage across the various stator coils in a switched sequence to produce a rotating magnetic field which causes the magnetic rotor to rotate. The torque/speed characteristic of a brushless dc motor is a function of: motor size, stator winding characteristics, load torque and applied voltage. For a given motor and load torque, the speed of the motor shaft is, therefore, proportional to the applied voltage.

Where a brushless dc motor is required to have a variable speed, it is common practice to connect it into a feedback loop and to use a pulse width modulation (PWM) amplifier to effect speed control. PWM amplifiers provide a variable level of output-drive voltage by varying the mark-space ratio of a square wave output. The switching between the ON and OFF states of the PWM amplifier is at a very much higher frequency than switching between different coils of the motor. The inductance of the stator coils smooths out the very high frequency square-wave voltage to a mean d.c. voltage level proportional to the mark-space ratio. PMW amplifiers have a high efficiency because their output drive circuit is always either in an OFF or an ON state. There is, therefore, a relatively small amount of power dissipated in the output drive circuit, all the power going to the motor.

The voltage applied to the motor is proportional both to the mark-space ratio of the PWM amplifier output supplied to the commutation circuit, and to the supply voltage applied to the motor via the commutation circuit. In many applications, the supply voltage can vary considerably with a consequent effect on the torque/speed of the motor. Although the supply voltage can be regulated by conventional means, the high load currents required by brushless d.c. motors means that series element power-supply regulators are inefficient, whereas switched-mode power supplies tend to be expensive and can be a source of electromagnetic interference.

BRIEF SUMMARY OF THE INVENTION

It is an object of the present invention to provide an improved power supply, such as for a d.c. motor, which can provide a regulated supply of power.

According to one aspect of the present invention there is provided a power supply including switching means arranged to receive a supply voltage, means for producing a ramp output that alternates at a fixed frequency and that increases gradually from a predetermined value to a second value dependent on the supply voltage, the power supply including comparator means that receives at one input the ramp output and at another input a steady signal, the comparator means being arranged to provide a pulse output signal in which the pulse is initiated and terminated at transitions of the steady signal and the ramp output, and the output of the comparator means being supplied to the switching means such that variation in the supply voltage is compensated for by variation in pulse width in such a way that the mean d.c. output of the supply is substantially independent of variations in the supply voltage.

In this way, the power supply can have a high efficiency without having a high cost.

The switching means may be a commutation circuit of a brushless d.c. motor. The means for producing a ramp output may include an integrator. The power supply may include a trigger circuit for controlling the frequency of the ramp output, the trigger circuit including a second comparator that receives an alternating ramp input and a fixed input, and the second comparator providing a trigger output to the means for producing a ramp output.

A circuit including a motor and power supply in accordance with the present invention, will now be described, by way of example, with reference to the accompanying drawings.

DESCRIPTION OF THE PREFERRED EMBODIMENTS

Figure 1:
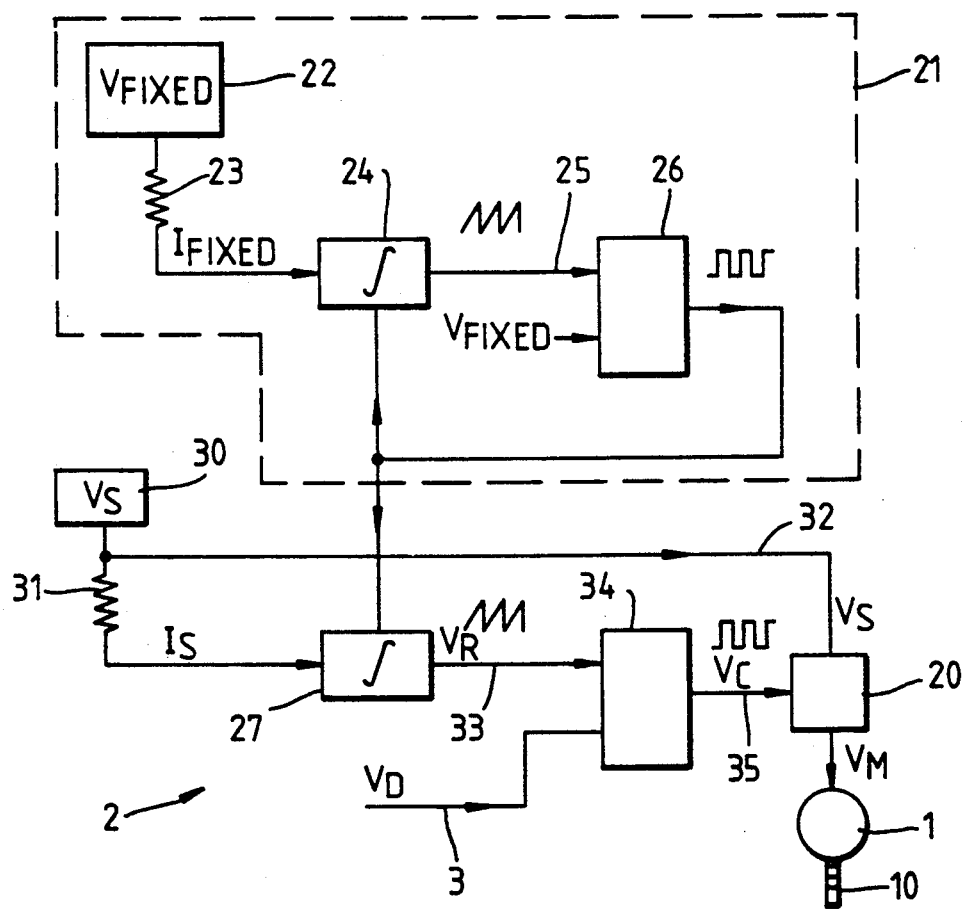
FIG. 1 shows the circuit schematically.

The circuit comprises a brushless d.c. motor 1 and a power supply 2 which controls the speed/torque of the motor in accordance with a demand signal $V_D$ on line 3.

The motor 1 is of conventional brushless d.c. construction with stator coils which can be energized to produce a rotating magnetic field that causes a magnetic rotor and its shaft 10 to rotate.

The power supply 2 includes a trigger circuit 21 which produces a trigger output of fixed frequency. The trigger circuit 21 includes a source 22 of fixed voltage which supplies a constant current via a resistor 23 to a first integrator 24. The integrator 24 produces a ramp voltage of fixed period on its output line 25 which is applied to one input of a comparator 26. The other input of the comparator 26 receives a fixed voltage derived from the source 22. The comparator 26 produces a trigger output in the form of a pulse when the ramp voltage exceeds the fixed voltage. This trigger output is supplied to the first integrator 24, to trigger the start of each ramp, and to a second integrator 27 outside the trigger circuit 21.

The second integrator 27 also acts as a ramp generator and has its input connected to a source 30 of unregulated supply voltage $V_S$ via a resistor 31 so that it receives an unregulated current $I_S$ proportional to the voltage. The unregulated supply voltage $V_S$ is also applied on line 32 to switching means in the form of a commutation circuit 20. The second integrator 27 produces a ramp signal $V_R$ on line 33 at a fixed repetition frequency determined by the trigger circuit 21. The magnitude of the ramp signal $V_R$ varies from some low predetermined value such as zero, at its minimum to that of the supply voltage $V_S$ at its maximum. The slope of the ramp signal, therefore, will vary according to the value of the supply voltage $V_S$, the slope being steeper for higher supply voltages. The ramp output $V_R$ of the second integrator 27 is supplied to one input of a second comparator 34. The other input of the comparator 34 is the demand signal $V_D$ by which the speed/torque of the motor 1 is selected. The comparator 34 produces a square wave signal $V_C$ that is supplied on line 35 to a control input of the commutation circuit 20. The commutation circuit 20 includes a number of solid state switching devices (not shown) which are closed in various combinations by the control input to connect the supply voltage $V_S$ across the required stator coil or coils in the correct polarity.

Figure 2A:
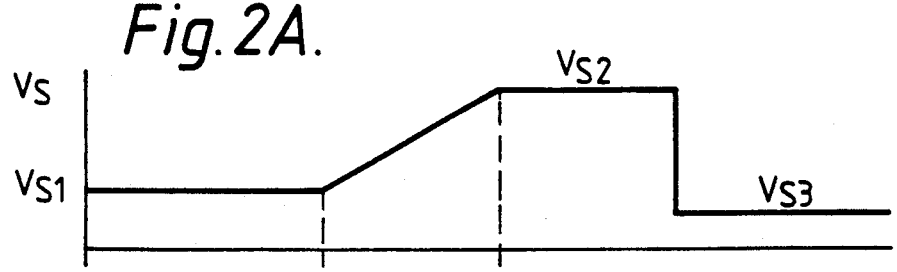
FIG. 2A–2E illustrate waveforms at various different parts of the circuit.
Figure 2B:
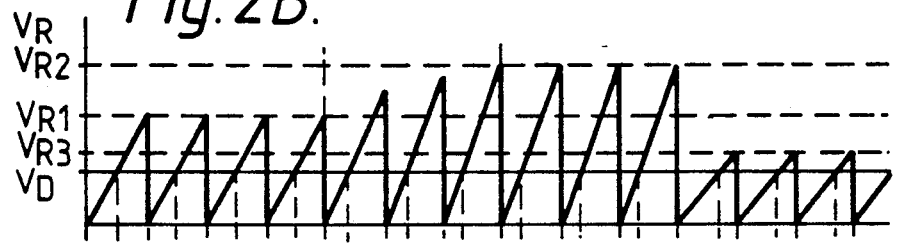
Figure 2C:
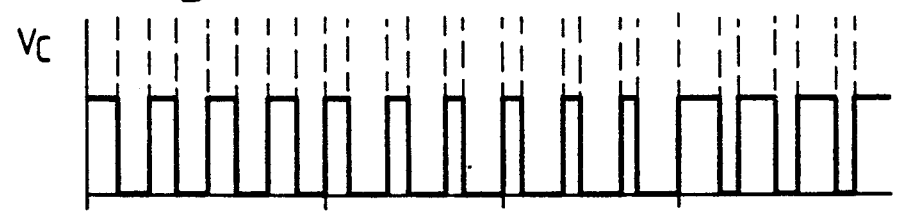
Figure 2D:
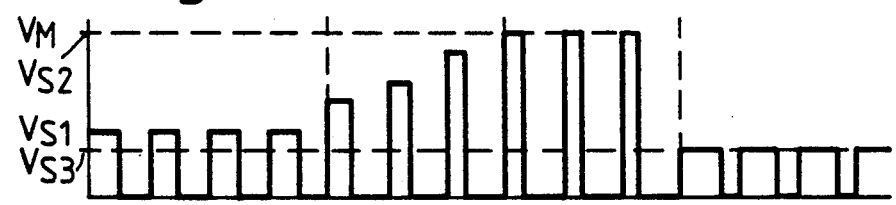
Figure 2E:
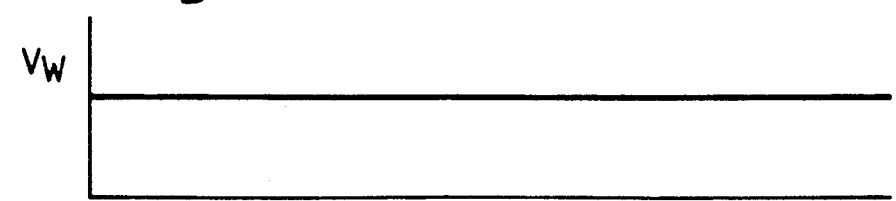

With reference now to FIG. 2, there is illustrated the effect of a change in the supply voltage $V_S$ on the signal $V_M$ supplied to the motor 1. FIG. 2A shows that the supply voltage $V_S$ is initially at a steady value $V_{S1}$, that it then rises gradually to a higher level $V_{S2}$, and finally, that it falls suddenly to a low level $V_{S3}$. This causes the ramp output $V_R$ from the second integrator 27 to change in the manner shown in FIG. 2B. Initially, each ramp pulse rises to the same maximum $V_{R1}$; they then rise more steeply to a higher value $V_{R2}$; subsequently they rise less steeply to a lower maximum $V_{R3}$. The repetition frequency of the ramp signal remains constant. For simplicity, it is assumed that the demand signal $V_D$ remains constant, as shown superimposed on the ramp voltage $V_R$ in FIG. 2B. The comparator 34 produces a square wave output Vc of the kind shown in FIG. 2C. Each square wave pulse is initiated and terminated at transitions of the steady demand signal $V_D$ and the ramp output $V_R$, such that the length or mark of each square wave pulse is equal to the time for which the demand signal $V_D$ is greater than the ramp voltage $V_R$. The space between adjacent pulses is, therefore, equal to the time for which the ramp voltage $V_R$ exceeds the demand signal $V_D$. During the time that the supply voltage $V_S$ is $V_{S1}$, the mark-space ratio of the signal $V_C$ is constant. When the supply voltage increases, the mark-space ratio of $V_C$ falls whereas, when the supply voltage $V_S$ falls to $V_{S3}$, the mark-space ratio increases. It will be appreciated that, during the pulse intervals, the commutation circuit 20 will pass the supply voltage Vs to the motor 1, whereas during the spaces between the pulses, the supply voltage will be blocked. Because the supply voltage varies, the amplitude of the voltage applied to the motor will vary during the pulse intervals, as shown by the waveform $V_M$ in FIG. 2D. The mark-space ratio varies inversely with supply voltage in such a way as to compensate for the effects of change in supply voltage when the waveform $V_M$ is smoothed and averaged by the inductance of the motor coils. This results in a steady voltage in the windings, as shown by Vw in FIG. 2E.

The circuit of the present invention compensates the output voltage for variation in supply voltage without loss of efficiency. It will be appreciated that the power supply of the present invention could be used in applications other than involving motors. The circuit could be digital, with the integrators being counters that provide a digital output. The first integrator would be clocked off at a constant frequency, the second integrator being clocked off by a voltage-controlled oscillator which is controlled by the magnitude of the supply voltage $V_S$.

Having thus described our invention, we claim:

1. A power supply including a switching circuit connected to receive a variable supply voltage, the power supply including a ramp generator that produces a ramp output whose amplitude alternates at a fixed frequency and increases gradually from a predetermined value to a second value that varies in response to variations in said variable supply voltage, a trigger circuit connected to control the frequency of the output of said ramp generator, the trigger circuit including a comparator and means supplying an alternating ramp input and a fixed input to said comparator, said comparator providing a trigger output to said ramp generator, the power supply further including a second comparator, means connecting the output of the ramp generator to one input of the second comparator, means supplying a steady signal to another input of the second comparator so that the second comparator provides a pulse output signal in which each pulse is initiated and terminated at transitions of the steady signal and the ramp output so that the pulse width varies in response to variations in said variable supply voltage, and means supplying the variable width pulse output of the second comparator to said switching circuit such that reduction in the supply voltage is compensated for by an increase in pulse width and such that an increase in the supply voltage is compensated for by a decrease in pulse width in such a way that the mean d.c. output of the power supply is substantially independent of variations in the variable supply voltage.

2. A power supply according to claim 1, wherein the ramp generator includes an integrator.

* * * * *